(12) United States Patent
Ma

(10) Patent No.: US 8,811,551 B2
(45) Date of Patent: Aug. 19, 2014

(54) METHOD AND APPARATUS FOR ESTIMATING A DOPPLER FREQUENCY

(75) Inventor: Zhangyong Ma, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/583,947

(22) PCT Filed: Mar. 11, 2010

(86) PCT No.: PCT/SE2010/050276
§ 371 (c)(1),
(2), (4) Date: Sep. 11, 2012

(87) PCT Pub. No.: WO2011/112128
PCT Pub. Date: Sep. 15, 2011

(65) Prior Publication Data
US 2013/0003807 A1    Jan. 3, 2013

(51) Int. Cl.
*H03D 1/04* (2006.01)
*H03D 1/06* (2006.01)
*H03K 5/01* (2006.01)
*H03K 6/04* (2006.01)

(52) U.S. Cl.
USPC ............ 375/346; 375/344; 375/340; 375/224

(58) Field of Classification Search
CPC .................................................. H04L 27/0014
USPC .................................. 375/346, 344, 340, 224
See application file for complete search history.

(56) References Cited

U.S. PATENT DOCUMENTS

| 6,603,962 B1 * | 8/2003 | Tong et al. ................. 455/226.3 |
| 2006/0062334 A1 * | 3/2006 | Kang ............................ 375/340 |

FOREIGN PATENT DOCUMENTS

WO    WO 2004109949 A1 * 12/2004

OTHER PUBLICATIONS

Tepedelenlioglu C Et Al: "Estimation of Doppler spread and signal strength in mobile communications with applications to handoff and adaptive transmission", Internet Citation, Apr. 2001, XP002197939.
Jingyu Hua et al: "A SNR-insensitive Doppler shift estimator in wireless communications", Communication Systems, 2008. ICCS 2008. 11TH IEEE Singapore International Conference on, IEEE, Piscataway, NJ, USA, Nov. 19, 2008, pp. 499-502, XP031400088, ISBN: 978-1-4244-2423-8 Section 2. Doppler Shift Estimator based on SEACF.
Hua Jingyu et al: "An Adaptive Doppler Shift Estimator in Mobile Communication Systems", IEEE Antennas and Wireless Propagation Letters, IEEE, Piscataway, NJ, US, vol. 6, Jan. 1, 2007, pp. 117-121, XP011184458, ISSN: 1536-1225, DOI: DOI:10.1109/LAWP.2007. 893097 Section 2. Signal Model and Doppler Shift Estimator.

* cited by examiner

*Primary Examiner* — Sam K Ahn
*Assistant Examiner* — Fabricio R Murillo Garcia

(57) ABSTRACT

A method for supporting wireless communication over a physical channel in a mobile broadband system includes providing an estimate of the channel and obtaining a channel autocorrelation function of a channel impulse response of the channel. The method also includes expressing the channel autocorrelation function as a zero order Bessel function and applying Taylor expansion to the zero order Bessel function. Additionally, the method includes performing derivation of the channel autocorrelation function to obtain an estimate of the maximum Doppler frequency and using the obtained estimate of the maximum Doppler frequency to compensate for a current Doppler effect in a receiver receiving the signals.

6 Claims, 5 Drawing Sheets

METHOD AND APPARATUS FOR ESTIMATING A DOPPLER FREQUENCY

TECHNICAL FIELD

The invention relates generally to a method and an apparatus for estimating a maximum Doppler frequency of a channel in a mobile broadband system.

BACKGROUND

The Doppler Effect is well known in the art. The Doppler Effect arises when a source or an object, emitting waves that propagate in a medium, is in motion relative to an observer or receiver. The Doppler Effect likewise arises as a source or an object, emitting waves that propagate in a medium, is still and an observer is moving relative to the source/object. The Doppler Effect is the change in frequency of a wave for an observer moving relative to the source of the wave. One commonly known example is when a vehicle sounding a siren approaches, passes and travels away relative an observer. As the vehicle approaches, the received frequency at the observer is higher compared to the emitted frequency from the vehicle. Just as the vehicle passes the observer, the frequency at the observer is identical to the emitted frequency. As the vehicle travels away from the observer, the frequency is lower at the observer compared to the emitted frequency from the vehicle.

This phenomenon affects all waves that propagate in a medium. Of course both the observer and the source emitting the waves may be in movement relative each other. In case both the observer and the source are moving, the total Doppler Effect may therefore result from both the movement of the source and the observer. Also the movement of the medium may affect the Doppler Effect.

The Doppler Effect, also called Doppler shift or Doppler frequency, is a factor that needs to be considered in mobile communication systems or applications in wireless mobile communications. It is generally important to have or obtain an accurate estimate of the maximum Doppler frequency in a mobile communication system, e.g. in order to receive and to process received radio signals properly. The maximum Doppler frequency provides information about the rate of change of the channel. Having an accurate estimation of the rate of change of the channel may aid the system in compensating for the change or adjusting different parameters of the channel in question.

The very essence of a mobile communication system is that the user of a mobile telephone or other wireless communication apparatus or device may move about freely, within radio coverage areas. As a user moves around, the communication channel may change. The communication channel is affected by the distance between the communication apparatus and the serving access node or base station, by objects, such as e.g. buildings, that are present in the area which is served by the access node or base station and so on. Also, a user may walk around at relatively low speed, or be situated in a car, bus, train or the like travelling at relatively high speed. This will also affect the Doppler Effect and also the channel will change more rapidly.

There are many Doppler frequency estimation methods. Some common methods are autocorrelation based techniques. These are of low complexity and have therefore been extensively used. However, many autocorrelation functions are nonlinear functions and it is difficult to accurately extract the maximum Doppler frequency from them.

SUMMARY

It is an object of the invention to address at least some of the problems outlined above. In particular, it is an object of the invention to support wireless communication over a physical channel in a mobile broadband system by estimating a maximum Doppler frequency of signals communicated over the channel. This object and others may be obtained by providing a method and an apparatus according to the independent claims attached below.

According to one aspect, a method is defined for supporting wireless communication over a physical channel in a mobile broadband system by estimating a maximum Doppler frequency of signals communicated over said channel. In this method, an estimate of the channel is provided. A channel autocorrelation function of a channel impulse response of the channel is also obtained. Then, the channel autocorrelation function is expressed as a zero order Bessel function. Taylor expansion of the zero order Bessel function is applied. Then, derivation of the channel autocorrelation function is performed to obtain an estimate of the maximum Doppler frequency. Finally, the obtained estimate of the maximum Doppler frequency is used to compensate for a current Doppler effect in a receiver receiving the signals.

According to an embodiment, obtaining an estimate of the maximum Doppler frequency comprises defining the maximum Doppler frequency, $D(x)$, as $D(x)=J_0(x)-a*J_0(2x)+b*J_0(3x)$, wherein a and b are constants and $J_0$ is the zero order Bessel function and x is $2\pi f_d \tau$, where $\tau$ is a sampling period and $f_d$ is the maximum Doppler frequency.

According to another embodiment, $\tau$ should meet the requirements of the Nyquist value, i.e.

$$\frac{1}{\tau} > 2f_d.$$

According to yet an embodiment, a is approximately 0.1 and b is approximately 0.0074.

In one example, $D(x)$ is approximated by $D(x) \approx 0.9074 - 0.1666x^2 + o(x^8)$.

According to another aspect, an arrangement in a communication node is provided. The arrangement is adapted for estimating a maximum Doppler frequency of signals communicated over a channel in a mobile broadband system, and it comprises a channel estimator adapted for estimating said channel. It further comprises an autocorrelation generator adapted for generating an autocorrelation function of a channel impulse response of the channel. It also comprises a processing unit adapted for expressing the channel autocorrelation function as a zero order Bessel function, for applying Taylor expansion of the zero order Bessel function, for performing derivation of the channel autocorrelation function to obtain an estimate of the maximum Doppler frequency, and for using the obtained estimate of the maximum Doppler frequency to compensate for a current Doppler effect in a receiver receiving the signals.

According to an embodiment, the processing unit adapted for obtaining an estimate of the maximum Doppler frequency is further adapted to define the maximum Doppler frequency, $D(x)$, as $D(x)=J_0(x)-a*J_0(2x)+b*J_0(3x)$, wherein a and b are constants and $J_0$ is the zero order Bessel function and x is $2\pi f_d \tau$, where $\tau$ is a sampling period and $f_d$ is the maximum Doppler frequency.

According to another embodiment, τ should meet the requirements of the Nyquist value, i.e.

$$\frac{1}{\tau} > 2f_d.$$

According to yet another embodiment, a is approximately 0.1 and b is approximately 0.0074.

In one example, D(x) is approximated by D(x)≈0.9074−0.1666x$^2$+o(x$^8$).

BRIEF DESCRIPTION OF DRAWINGS

The invention is now described, by way of example, with reference to the accompanying drawings, in which.

DETAILED DESCRIPTION

In the following, a detailed description of some embodiments of a procedure for estimating a maximum Doppler frequency of signals communicated over a communication channel will be provided. Likewise, a detailed description of some embodiments of an arrangement in a communication node adapted for estimating a maximum Doppler frequency of signals communicated over a channel will be provided.

Figure 1:
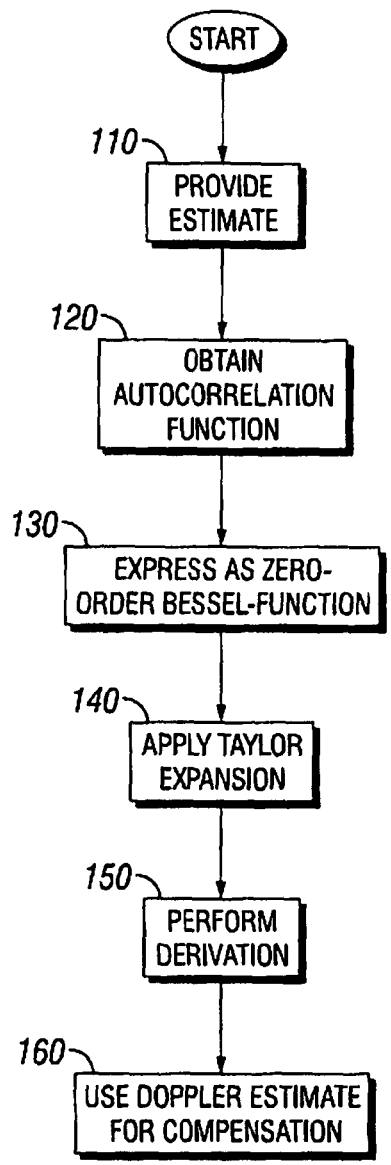
FIG. 1 is a flowchart generally illustrating an embodiment of a procedure for estimating a maximum Doppler frequency of signals communicated over a communication channel.

FIG. 1 is a flowchart illustrating an embodiment of a procedure for supporting wireless communication over a physical channel in a mobile broadband system by estimating a maximum Doppler frequency of signals communicated over a communication channel. The steps in this figure may be executed in a communication node. Such a communication node may be an access node in a radio access network or a user terminal.

In FIG. 1 the procedure starts with a first step 110 of providing an estimate of the channel. This may be performed in different ways. One example will now be briefly described. A pilot signal comprising pilot symbols may be sent from a transmitter e.g. in a user terminal or an access node in a radio access network. As the pilot signal is received by a receiver, it may be processed in various ways. For example, the signal may be filtered, amplified and converted into digital samples. The processed signal or rather the samples after processing are provided to a channel estimator. The channel estimator correlates the received digital samples with known symbols to provide an estimate of the channel. The receiver has the pilot signal comprising pilot symbols stored in e.g. a memory so that the signal and/or symbols are known beforehand by the receiver so that the receiver can compare or correlate the received signal and/or symbols to the known signal and/or symbols. The pilot symbols may be any known reference symbols.

For flat fading conditions, the channel impulse response can be represented as $$h(t,\tau)=\gamma(t)\delta(\tau) \quad (1)$$

γ(t) is a wide-sense stationary stochastic process with zero mean and unit variance.

$$\delta(\tau) = \begin{cases} 1 & \tau = 0 \\ 0 & \text{otherwise,} \end{cases}$$

wherein τ is a sampling period.

FIG. 1 further illustrates a second step 120 of obtaining a channel autocorrelation function of a channel response of the channel in question. Using the channel estimates obtained from the pilot signal or pilot symbols, the autocorrelation function can be derived. The autocorrelation function is denoted $r_f(\tau)$.

According to this embodiment the procedure further comprises the step 130 of expressing the channel autocorrelation function as a zero order Bessel function.

The autocorrelation function is $r_f(\tau)=J_0(2\pi f_d\tau)$, where $f_d$ is the maximum Doppler frequency, τ is a sampling period and $J_0$ is the zero order Bessel function of the first kind.

A further step 140 is to apply Taylor expansion on the zero order Bessel function of the first kind.

According to the embodiment of the method illustrated in FIG. 1, a further step 150 is to perform derivation of the channel autocorrelation function, $r_f(\tau)$, to obtain an estimate of the maximum Doppler frequency.

A final step 160 in the embodiment of the method illustrated in FIG. 1, is to use the obtained estimate of the maximum Doppler frequency to compensate for a current Doppler effect in a receiver receiving the signals.

According to an embodiment, the selection of τ should meet the requirements of the Nyquist value. In other words, $$\frac{1}{\tau} > 2f_d.$$

Assume that the maximum $f_d$ in a real system is about 1000 Hz, then τ should be less than 0.5 ms. Applying Taylor expansion gives:

$$J_0(x) = 1 - \frac{1}{4}x^2 + \frac{1}{64}x^4 - \frac{1}{2304}x^6 + o(x^8) \quad (2)$$

$$J_0(2x) = 1 - x^2 + \frac{1}{4}x^4 - \frac{1}{36}x^6 + o(x^8) \quad (3)$$

$$J_0(3x) = 1 - \frac{9}{4}x^2 + \frac{81}{64}x^4 - \frac{81}{256}x^6 + o(x^8) \quad (4)$$

Where x=2π$f_d$τ and $f_1(x)=o(f_2(x))$. As x→0 then $$\frac{f_1(x)}{f_2(x)}$$

is bounded in a neighborhood around zero. In conventional methods, for small x, $$1 - \frac{x^2}{4}$$

is used to approximate $J_0$ and x, or equivalently, the maximum Doppler frequency can be obtained easily by solving the quadratic equation $$1 - \frac{x^2}{4} = r_J(\tau).$$

However, as x increases, the accuracy of this solution decreases rapidly due to the introduction of the approximation error $$\frac{x^4}{64} - \frac{x^6}{2304} + o(x^8).$$

In order to increase the accuracy, it is necessary to use the approximation $$1 - \frac{x^2}{4} + \frac{x^4}{64} \text{ or even } 1 - \frac{x^2}{4} + \frac{x^4}{64} - \frac{x^6}{2304}.$$

Unfortunately, it would be difficult to solve the equations formed by them, since the degree of $r_J(\tau)=J_0(2\pi f_d \tau)$ is greater than 2.

From (2) and (3), we define:

$$D_1(x) = J_0(x) - \frac{1}{16}j_0(2x) = \frac{15}{16} - \frac{3}{16}x^2 + \frac{1}{768}x^6 + o(x^8) \quad (5)$$

X is calculated and from $$\frac{15}{16} - \frac{3x^2}{16} = r_J(\tau) - \frac{r_J(2\tau)}{16}$$

we find that not only does the equation remain a quadratic equation, but also the approximation error is reduced to $$\frac{x^6}{768} + o(x^8).$$

According to an embodiment of the procedure, the maximum Doppler frequency, D(x), is defined as $D(x)=J_0(x)-a^*J_0(2x)+b^*J_0(3x)$, wherein a and b are constants and $J_0$ is the zero order Bessel function and x is $2\pi f_d \tau$, where $\tau$ is a sampling period and $f_d$ is the maximum Doppler frequency.

From (2), (3) and (4) the following can be solved:

$$\begin{bmatrix} \frac{1}{64} \\ \frac{1}{2304} \end{bmatrix} = \begin{bmatrix} \frac{1}{4} & -\frac{81}{64} \\ \frac{1}{36} & -\frac{81}{256} \end{bmatrix} \begin{bmatrix} a \\ b \end{bmatrix} \quad (6)$$

$a \approx 0.1$ and $b \approx 0.0074$ are obtained. Then $D(x)=J_0(x)-0.1^*J_0(2x)+0.0074^*J_0(3x) \approx 0.9074-0.1666x^2+o(x^8)$.

In this solution, only $o(x^8)$ is left and this indicates that a more accurate result can be obtained. One of the advantages of the procedure is that it can be used to improve the accuracy of the estimation of the Doppler frequency. This can be useful in several situations and systems. It can be very useful in the Channel State Information Reference Signal (CSI-RS) in Long Term Evolution Advanced (LTE-A), where the CSI-RS allocation is dependent on the changing rate of the wireless channel. From the estimated Doppler frequency, the overhead due to CSI-RS could be optimized which could contribute to improving the overall throughput of the system. By the estimated Doppler frequency, a guide could be given to reduce the unnecessary channel estimation due to low Doppler frequency.

Figure 2:
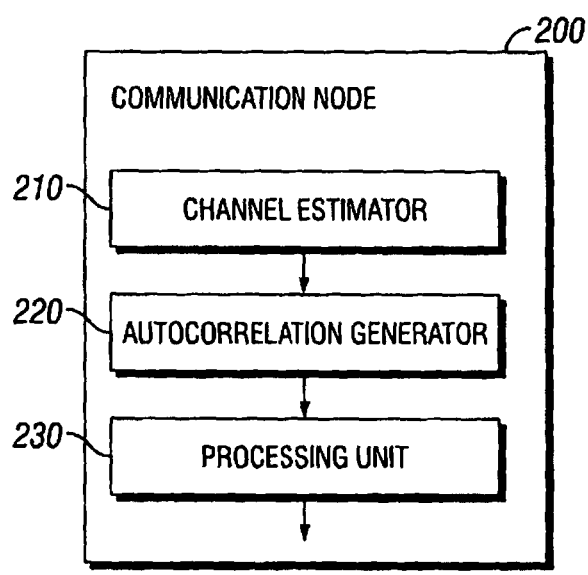
FIG. 2 is a schematic block diagram illustrating an arrangement in a communication node adapted for estimating a maximum Doppler frequency of signals communicated over a channel.

FIG. 2 is a schematic block diagram illustrating an embodiment of an arrangement in a communication node 200 adapted for estimating a maximum Doppler frequency of signals communicated over a channel. The communication node could be any node in a wireless communication network receiving signals over a radio interface, e.g. a user equipment or an access node in a radio access network.

The arrangement comprises a channel estimator 210 adapted to estimate the channel. Estimating the channel may be performed in different ways. One example was briefly described above and will not be repeated again.

The arrangement further comprises an autocorrelation generator 220 adapted to generate an autocorrelation function of a channel impulse response of the channel.

The arrangement further comprises a processing unit 230 adapted to express the channel autocorrelation function as a zero order Bessel function, to apply Taylor expansion of the zero order Bessel function, to perform derivation of the channel autocorrelation function to obtain an estimate of the maximum Doppler frequency, and to use the obtained estimate of the maximum Doppler frequency to compensate for a current Doppler effect in a receiver receiving the signals.

According to another embodiment, the processing unit 230 is further adapted to define the maximum Doppler frequency, D(x), as $D(x)=J_0(x)-a^*J_0(2x)+b^*J_0(3x)$, wherein a and b are constants and $J_0$ is the zero order Bessel function and x is $2\pi f_d \tau$, where $\tau$ is a sampling period and $f_d$ is the maximum Doppler frequency.

According to an embodiment, $\tau$ should meet the requirements of the Nyquist value, i.e.

$$\frac{1}{\tau} > 2f_d.$$

According to yet another embodiment, a is approximately 0.1 and b is approximately 0.0074, so that $D(x)=J_0(x)-0.1^*J_0(2x)+0.0074^*J_0(3x)$.

In one example, D(x) is approximated by $D(x) \approx 0.9074-0.1666x^2+o(x^8)$.

It should be noted that FIG. 2 merely illustrates various functional units in the arrangement in a communication node in a logical sense. However, the skilled person is free to implement these functions in practice using any suitable software and hardware means. Thus, the invention is generally not limited to the shown structures of the arrangement in the communication node 200 and its functional units 210-230.

Figure 3:
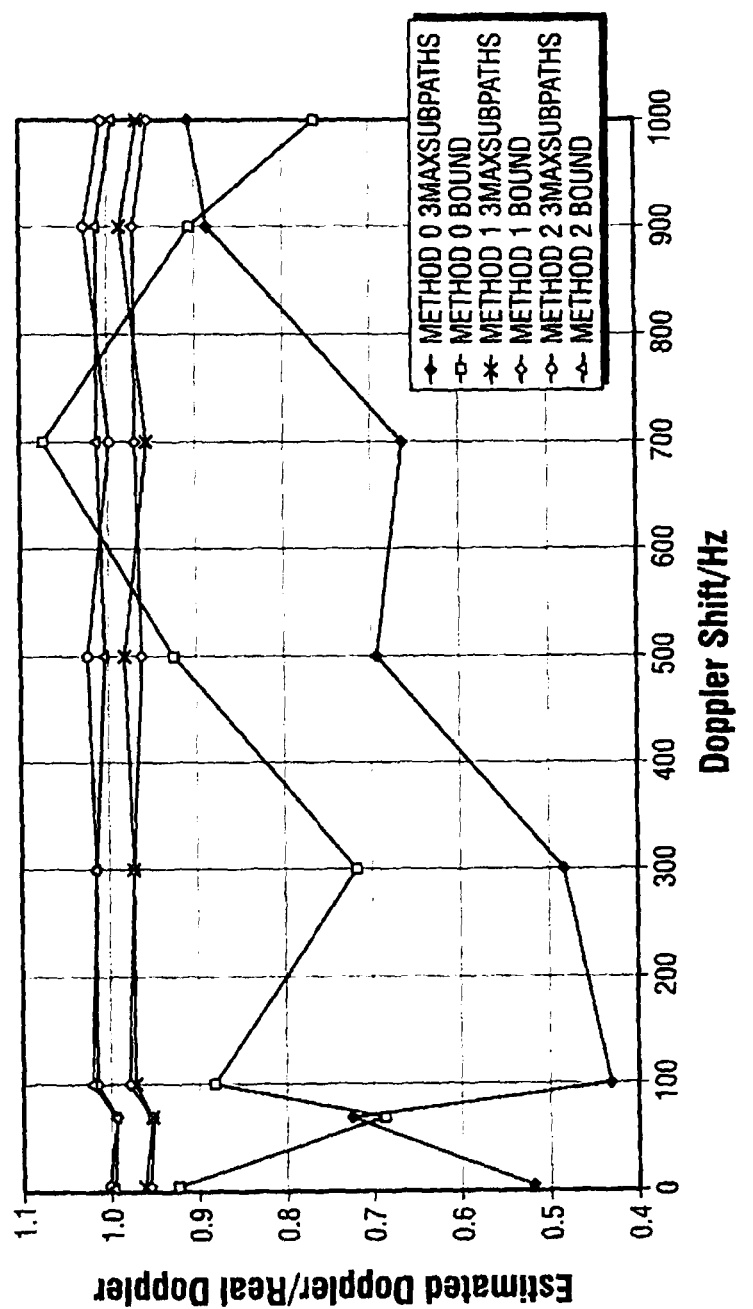
FIG. 3 is a diagram of parameter subpaths for performance comparisons for calculating autocorrections, according to an exemplary embodiment.

To evaluate the performance of the proposed procedure, Monte Carlo simulations are used. In 3GPP TS 36.104 the so called ETU3 channel is specified. This channel is used in the simulator. The parameters of each subpath are shown in FIG. 3.

To illustrate the performance of the proposed method, it is compared to a known method to estimate the Doppler frequency. This known method uses an algorithm which is given below. It will be referenced to as a prior art solution [P].

$$\left.\begin{array}{c} k_1 = -\dfrac{r[1]}{r[0]} \\ k_2 = -\dfrac{r[2]+r[1]k_1}{r[0](1-|k_1|^2)} = \dfrac{r[1]^2 - r[2]r[0]}{r[0]^2 - r[1]^2} \\ k_3 = -\dfrac{r[3]+r[2](k_1+k_1k_2)+r[1]k_2}{r[0](1-|k_1|^2)(1-|k_2|^2)} \\ \hat{f}_D^{(m)} = \dfrac{1}{\pi\tau}\arccos(|\hat{k}_m|) \end{array}\right\} \quad [P]$$

Figure 4:
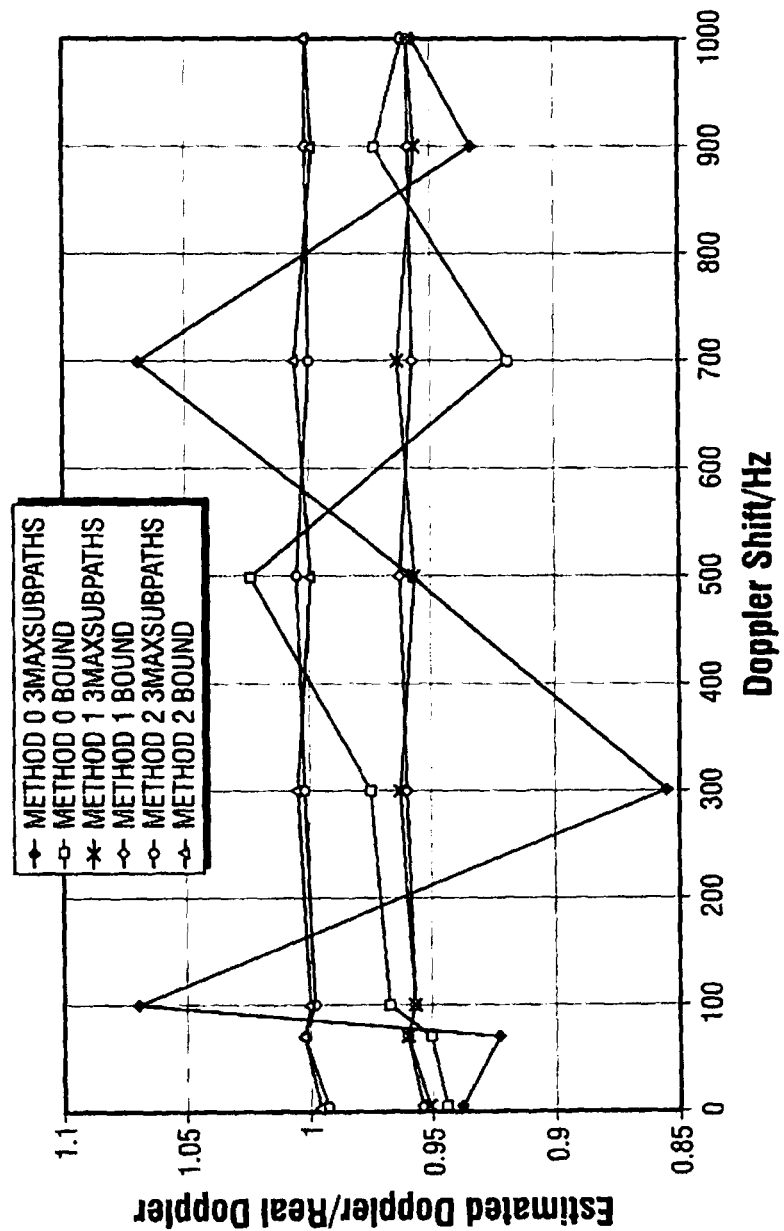
FIG. 4 is a diagram of performance comparisons for calculating autocorrections with 4 samples, according to an exemplary embodiment.

The channel autocorrelation function mostly decides the complexity of the estimator. FIG. 3 also illustrates that there are 9 subpaths for the ETU3 channel. The ideal case is that the positions of all subpaths are known, which is not practical, however, from the viewpoint of the implementation. A more realizable method would be to extract some subpaths, which have maximum power. In both FIGS. 3 and 4, the Signal-to-Noise-Ratio (SNR) is equal with 5 dB. The overall performance of all procedures for calculating an autocorrelation function based on 20 samples, as shown in FIG. 3, is better than in the case of 4 samples, as shown in FIG. 4. This is especially true for the prior art solution [P].

The performance comparisons among $D_1(x)$, $D(x)$ and [P] is presented which include an ideal case and three paths are selected which have maximum power among the samples.

The prior art procedure in [P] is very dependent on the number of samples of the autocorrelation function. If the number of samples is high, the performance in the prior art solution is stable, however resulting in a high degree of complexity. In the case of having only four samples, $D_1(x)$, $D(x)$ are more stable in term of the different Doppler frequencies from 0 to 1000 Hz.

The maximum bias of the prior art solution [P] is up to 55% compared to the true Doppler frequency. It is also shown that the gap between the ideal case and the practical case is very wide for the prior art solution [P], which is up to 25%. For $D_1(x)$ and $D(x)$ the gap is much smaller, up to 2% which is very small in comparison. As $D(x)$ is approximated to $o(x^8)$, its performance is better than $D_1(x)$.

Figure 5:
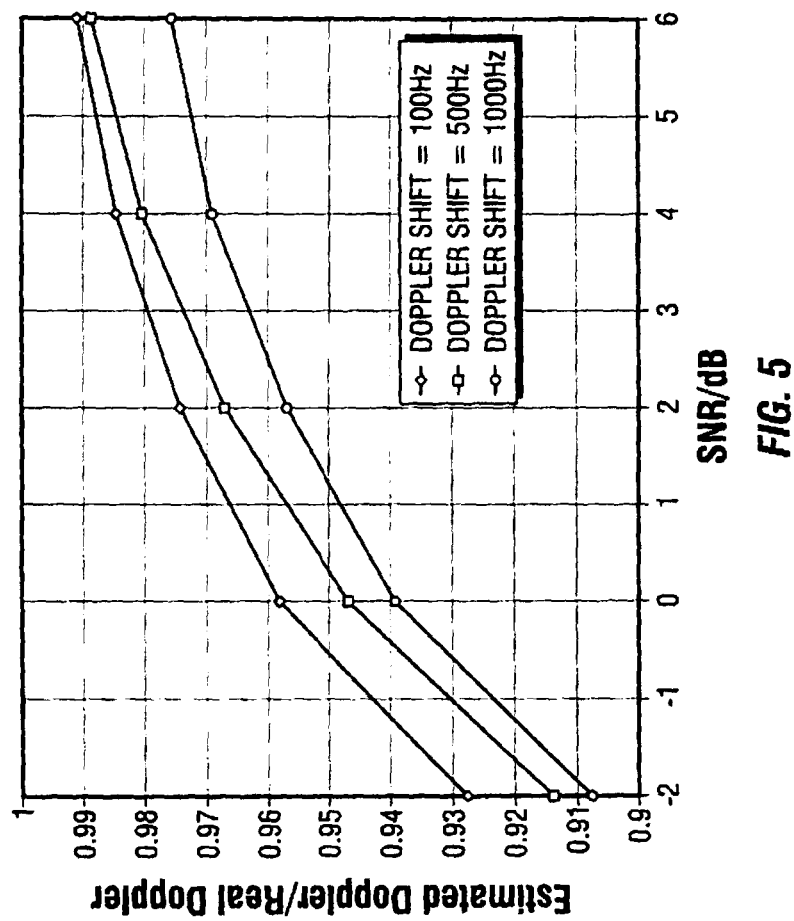
FIG. 5 is a diagram of various Doppler frequencies or shifts, according to an exemplary embodiment.

In FIG. 5, the performance is illustrated for estimating different Doppler frequencies from 100 Hz to 1000 Hz in different power. It is clearly illustrated that the performance is improved with an increasing received SNR. In 6 dB, the maximum bias for different Doppler frequencies is only less than 3%.

The procedure and arrangement described above have several advantages. Firstly, the accuracy of the estimation of Doppler frequency can be improved. Another advantage is that the complexity of the receivers in a wireless communication system can be reduced without losing performance.

The procedure and arrangement could be used in any wireless communication systems e.g. CDMA (Code Division Multiple Access), LTE and LTE-A.

While the invention has been described with reference to specific exemplary embodiments, the description is generally only intended to illustrate the inventive concept and should not be taken as limiting the scope of the invention. The present invention is defined by the appended claims.

The invention claimed is:

1. A method for supporting wireless communication over a physical channel in a mobile broadband system by estimating a maximum Doppler frequency of signals communicated over said channel, the method comprising:
   providing an estimate of said channel by a channel estimator;
   obtaining a channel autocorrelation function of a channel impulse response of said channel;
   expressing said channel autocorrelation function as a zero order Bessel function;
   applying Taylor expansion to said zero order Bessel function;
   performing derivation of said channel autocorrelation function to obtain an estimate of said maximum Doppler frequency; and
   using said obtained estimate of said maximum Doppler frequency to compensate for a current Doppler effect in a receiver receiving said signals, wherein
   obtaining an estimate of said maximum Doppler frequency comprises defining said maximum Doppler frequency, $D(x)$, as $D(x)=J_0(x)-a*J_0(2x)+b*J_0(3x)$, wherein a and b are constants and $J_0$ is the zero order Bessel function and x is $2\pi f_d\tau$, where $\tau$ is a sampling period and $f_d$ is the maximum Doppler frequency, and a is approximately 0.1 and b is approximately 0.0074.

2. The method of claim 1 wherein $$\frac{1}{\tau} > 2f_d.$$

3. The method of claim 1 wherein $D(x)$ is approximated by $D(x) \approx 0.9074 - 0.1666x^2 + o(x^8)$.

4. A communication node adapted for estimating a maximum Doppler frequency of signals communicated over a channel in a mobile broadband system, the arrangement comprises:
   a channel estimator adapted for estimating said channel;
   an autocorrelation generator adapted for generating an autocorrelation function of a channel impulse response of said channel; and
   a processing unit adapted for expressing said channel autocorrelation function as a zero order Bessel function, for applying Taylor expansion to said zero order Bessel function, for performing derivation of said channel autocorrelation function to obtain an estimate of said maximum Doppler frequency, and for using said obtained estimate of said maximum Doppler frequency to compensate for a current Doppler effect in a receiver receiving said signals, wherein
   said processing unit is further adapted to define said maximum Doppler frequency, $D(x)$, as $D(x)=J_0(x)-a*J_0(2x)+b*J_0(3x)$, wherein a and b are constants and $J_0$ is the zero order Bessel function and x is $2\pi f_d\tau$, where $\tau$ is a sampling period and $f_d$ is the maximum Doppler frequency, and a is approximately 0.1 and b is approximately 0.0074.

5. The communication node of claim 4 wherein $$\frac{1}{\tau} > 2f_d.$$

6. The communication node of claim 4 wherein $D(x)$ is approximated by $D(x) \approx 0.9074 - 0.1666x^2 + o(x^8)$.

* * * * *